W. A. OTTO.
TIRE PROTECTOR.
APPLICATION FILED NOV. 5, 1915.
1,181,243.
Patented May 2, 1916.
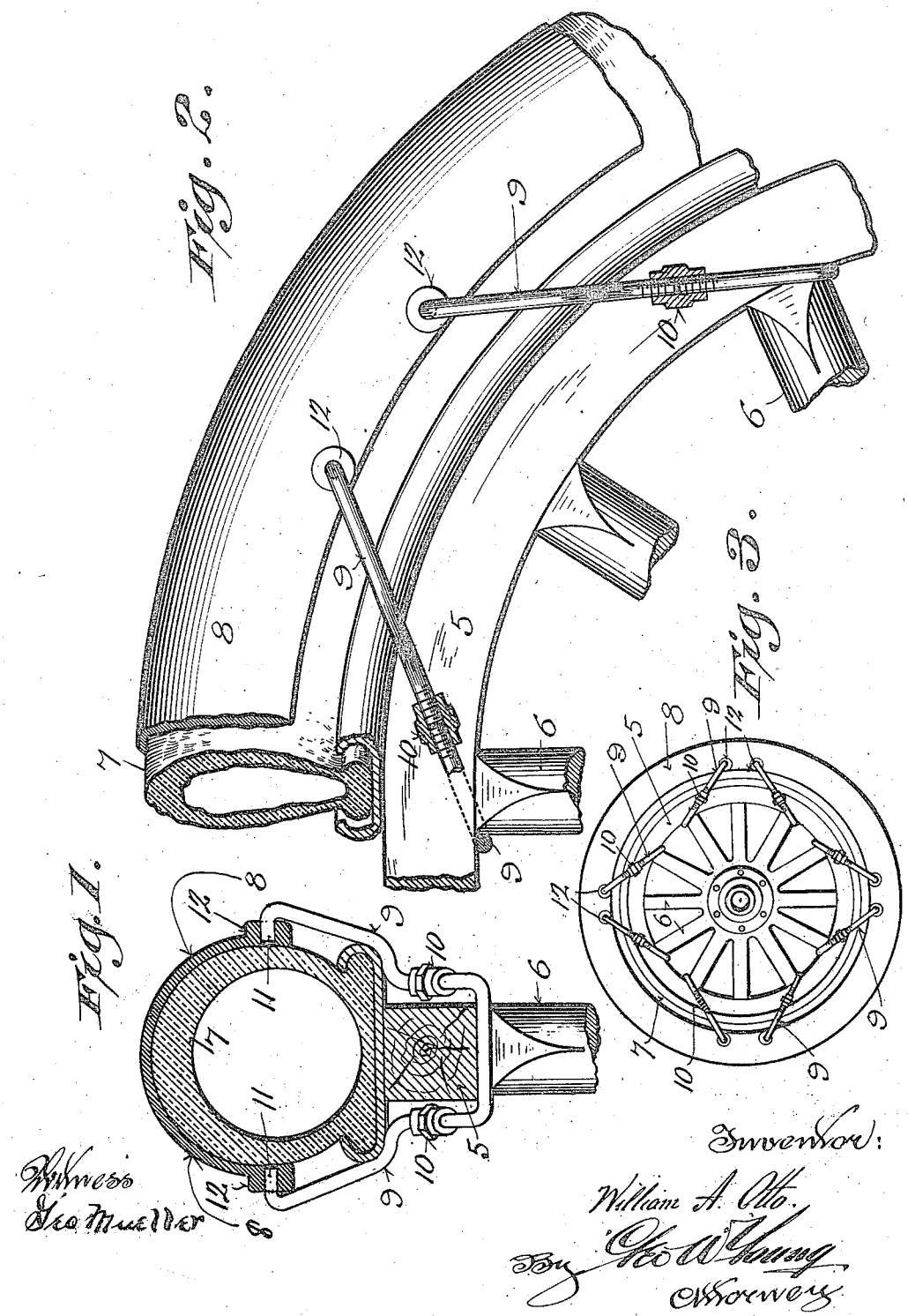

UNITED STATES PATENT OFFICE.

WILLIAM A. OTTO, OF MILWAUKEE, WISCONSIN.

TIRE-PROTECTOR.

1,181,243.   Specification of Letters Patent.   Patented May 2, 1916.

Application filed November 5, 1915. Serial No. 59,712.

*To all whom it may concern:*

Be it known that I, WILLIAM A. OTTO, a citizen of the United States, and resident of Milwaukee, in the county of Milwaukee and State of Wisconsin, have invented certain new and useful Improvements in Tire-Protectors, and do hereby declare that the following is a full, clear, and exact description thereof.

The present invention relates to new and useful improvements in protective shields for pneumatic tired wheels, and is particularly directed to the provision of means for securing such shields in place.

It is an object of the present invention to provide such securing means wherein a shield member may be readily attached on a wheel and may be held against turning or other undesirable movement, such securing means being adapted to be associated with a wheel without necessitating any modification of the structure thereof or the boring of any holes therein which might weaken its construction.

With the above and other objects and advantages in view, the invention resides more particularly in the novel combination, arrangement and formation of parts more particularly hereinafter described and particularly pointed out in the appended claims.

Reference is had to the accompanying drawings wherein similar characters of reference designate corresponding parts throughout the several views and in which:

Figure 1 is a cross sectional view of the tire portion of a wheel showing a protector shield applied on the tire and held in place by the improved securing means. Fig. 2 is a side elevation of the tire portion of a wheel, having positioned thereon the improved securing means. Fig. 3 is a side elevational view of an entire wheel showing the shield, a securing means applied thereto.

Referring now more particularly to the accompanying drawings, there is shown the felly 5 of a wheel of the usual type for automobiles which is carried by the usual manner a pneumatic tire 7. This tire may comprise either a single or a double tube, a single tube being shown in the drawings.

A shield member 8 arcuate in cross section is disposed on the thread portion of the tire, and this shield member may be formed of metal or of any other desired material. For securing this shield member in place, a plurality of U-shaped members 9 are provided which are adapted to receive the felly 5, in their bight portions, and which have their arms extensible by reason of being formed in sections connected by turnbuckle sleeves 10. The outer portions of the arms of these securing members are outwardly offset to avoid the rim portion of the felly, and are divergent, and terminate in inward extensions 11, which are engageable in socketed bosses 12, carried at the rim portions of the shield. In securing the members in place, they are positioned to embrace the felly of the wheel, and their inwardly bent ends 11 are engaged in the bosses. The turn buckles 10 are then rotated to draw said ends inwardly whereby they are held against displacement, it being noted that the portions 11 are disposed at acute angles to the directions of pull of the arms. The arms of the securing members are resilient so that they will hold themselves in place while the turn-buckles are tightened.

The bosses 12 are preferably arranged in pairs about each edge portion of the shield and the securing members which are associated with each set of bosses diverge so as to each extend diagonally across a respective spoke end whereby the securing members hold the shield against any tendency to turn longitudinally on the wheel.

I claim—

The combination of a shield member for the tread portion of a wheel outwardly projecting hollow bosses on the side edge portions of the shield member and securing members for the shield member each formed in substantially U-shape to embrace the felly of a wheel, the free ends of the arms of said members being outwardly divergent and having inward extensions at their extremities engageable in the bosses and means for varying the lengths of said arms.

In testimony that I claim the foregoing I have hereunto set my hand, at Milwaukee, in the county of Milwaukee and State of Wisconsin.

WILLIAM A. OTTO.